(12) United States Patent
Bose et al.

(10) Patent No.: US 9,669,358 B2
(45) Date of Patent: Jun. 6, 2017

(54) METHODS AND APPARATUS FOR CROSSFLOW REACTORS

(71) Applicants: Dürr Systems GmbH, Bietigheim-Bissingen (DE); Dürr Systems, Inc., Plymouth, MI (US)

(72) Inventors: Antoine Bose, Shanghai (CN); Erhard Rieder, Herrenberg (DE)

(73) Assignee: Dürr Systems AG, Bietigheim-Bissingen (DE)

(*) Notice: Subject to any disclaimer, the term of this patent is extended or adjusted under 35 U.S.C. 154(b) by 0 days.

(21) Appl. No.: 14/644,008

(22) Filed: Mar. 10, 2015

(65) Prior Publication Data

US 2016/0263525 A1 Sep. 15, 2016

(51) Int. Cl.
*B01D 53/86* (2006.01)
*B01D 53/88* (2006.01)
(Continued)

(52) U.S. Cl.
CPC .......... *B01D 53/8678* (2013.01); *B01J 8/025* (2013.01); *B01J 8/0214* (2013.01); *B01J 8/0257* (2013.01); *B01J 8/0278* (2013.01); *B01J 8/0415* (2013.01); *B01J 8/0492* (2013.01); *B01D 2255/903* (2013.01); *B01D 2258/0283* (2013.01); *B01J 2208/0092* (2013.01); *B01J 2208/00893* (2013.01); *B01J 2208/00938* (2013.01); *B01J 2208/021* (2013.01); *B01J 2219/0004* (2013.01); *B01J 2219/182* (2013.01); *B01J 2219/185* (2013.01)

(58) Field of Classification Search
CPC ...... B01D 53/86; B01D 53/88; B01D 53/885; B01D 2255/903; B01J 8/02; B01J 8/0242; B01J 8/025; B01J 8/0446
See application file for complete search history.

(56) References Cited

U.S. PATENT DOCUMENTS

| 2,315,525 A | 4/1943 | Hulsberg |
| 2,327,045 A | 8/1943 | Huff |

(Continued)

FOREIGN PATENT DOCUMENTS

| DE | 19836289 | 2/2000 |
| EP | 1277701 | 1/2003 |

(Continued)

OTHER PUBLICATIONS

API, "Filstar XP User Guide," published by Mars Fishcare North America, accessed on Mar. 3, 2015, 13 pages.

(Continued)

*Primary Examiner* — Timothy Vanoy
(74) *Attorney, Agent, or Firm* — Hanley, Flight & Zimmerman, LLC (57) ABSTRACT

Methods and apparatus for cross flow process reactors are disclosed. A disclosed example includes a process chamber having an inlet and an outlet to allow a flow of fluid to flow therethrough and a plurality of trays disposed within the process chamber, and containing bulk material to treat the fluid. The example apparatus also includes a flow director to divide the flow into a plurality of partial flow streams, where each partial flow stream is to be directed towards at least one tray of the plurality of trays.

33 Claims, 7 Drawing Sheets

(51) Int. Cl.
*B01J 8/02* (2006.01)
*B01J 8/04* (2006.01)

(56) References Cited

U.S. PATENT DOCUMENTS

| | | | |
|---|---|---|---|
| 2,338,346 A | | 1/1944 | Mather |
| 2,443,773 A | | 6/1948 | Matuszak |
| 3,925,252 A | | 12/1975 | Yabuta et al. |
| 3,996,025 A | | 12/1976 | Gulden |
| 2012/0094364 A1 | * | 4/2012 | Lali .................... B01J 8/085 435/283.1 |
| 2013/0001166 A1 | * | 1/2013 | Augier ............... B01D 15/1842 210/661 |
| 2016/0009614 A1 | * | 1/2016 | Laroche ............ B01D 15/1828 585/828 |

FOREIGN PATENT DOCUMENTS

| WO | WO 95/29752 A1 | * | 11/1995 | ............ B01D 3/166 |
|---|---|---|---|---|
| WO | 2014181080 | | 11/2014 | |

OTHER PUBLICATIONS

FGKH, "SCR Reactor Design Criteria: Summary," [http://fluegasknowhow.com/denox/scr-reactor-design-criteria/], accessed on Mar. 3, 2015, 11 pages.

"Schematic of the Catalytic Combustor," [http://firebrand.me.berkeley.edu/cpchou/catalysis/caf10.gif], accessed on Mar. 10, 2015, 1 page.

International Searching Authority, "International Search Report," issued in connection with International Application No. PCT/EP2016/052253, mailed on Apr. 21, 2016, 9 pages.

International Searching Authority, "Written Opinion of the International Searching Authority," issued in connection with International Application No. PCT/EP2016/052253, mailed on Apr. 21, 2016, 9 pages.

\* cited by examiner

FIG. 7

METHODS AND APPARATUS FOR CROSSFLOW REACTORS

FIELD OF THE DISCLOSURE

This disclosure relates generally to reactors, and, more particularly, to methods and apparatus for crossflow reactors.

BACKGROUND

Typically, monolithic catalyst reactors, as an example of crossflow reactors, are used to process fluids (e.g., gases) resulting from industrial processes such as combustion processes for steam generation to produce electricity, for example. Often, certain compounds need to be reduced and/or eliminated from the resultant fluid of an industrial process to meet certain environmental and/or regulatory standards.

Monolithic ceramic honeycomb catalyst reactors are typically used, but are relatively expensive and have a decreased resistance towards catalyst poisons and inhibitors. Often, monolithic honeycomb catalysts have high breakage rates due to catalyst damage resulting from significant differences in thermal expansion between the ceramic catalyst and a steel support structure containing and/or positioning the ceramic catalyst. These known monolithic catalyst honeycomb reactors are typically used to avoid lower gas velocities often associated with bulk catalyst (e.g., randomly packed catalysts, etc.). Such lower velocities and/or high pressure drops typically result from crushed and/or damaged catalyst material. The same principle may hold when comparing known monolithic filtration appliances to bulk filtration systems, especially while filtering hot fluids or fluids with fluctuating temperatures, or while comparing regenerative thermal reactors comprising monolithic heat recovery media versus such reactors with bulk heat recovery media.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus for crossflow reactors are disclosed herein. Typically catalytic reactors such as monolithic honeycomb catalyst reactors are used to treat and/or process gases resulting from industrial processes such as burning fuel to generate electricity, for example. Such reactors typically utilize catalyst blocks having channels and are composed of catalyst material (e.g., precious metals, etc.). The channels typically extend through the entire catalyst block. These monolithic honeycomb catalyst reactors often experience high breakage rates due to catalyst damage induced by differences in thermal expansion between the ceramic-type catalyst block and a steel support structure holding and/or mounting the catalyst block, for example.

Often monolithic honeycomb catalyst reactors are used to avoid decreased velocities associated with bulk material catalyst used in known examples. The decreased velocities are commonly encountered because of crushed or damaged bulk catalyst material, and/or the flow of the process gasses moving through a singular channel (e.g., route), thereby resulting in significant pressure drops as the process fluid flows through an often singular compartment of bulk catalyst material.

The same may hold true while comparing known monolithic filtration appliances to bulk filtration systems, especially while filtering hot fluids or fluids with fluctuating temperatures, or while comparing regenerative thermal reactors comprising monolithic heat recovery media versus such reactors with bulk heat recovery media.

The examples disclosed herein allow use of bulk material, especially bulk material catalyst (e.g., randomly packed catalysts), which has significant cost savings in relation to monolithic types, while maintaining significantly high fluid velocities (e.g., process gas velocities) not typically seen in known bulk material systems. The examples disclosed herein allow effective flow of the process fluid through multiple trays of catalyst disposed within a catalyst reactor vessel. The examples disclosed herein also reduce and/or eliminate crushing and/or damage of the bulk material (e.g., damage due to thermal expansions and/or differences of thermal expansion, etc.), which may cause velocity reduction and/or significant pressure drops (e.g., lower flow rates, etc.) through the bulk material. The examples disclosed herein also allow reactor plants to have a smaller footprint or size. In particular, the examples disclosed herein may have similar sizes and/or compactness in comparison to known monolithic honeycomb block reactors.

As used herein, the term "process chamber" refers to a chamber, vessel, container (e.g., hollow container) and/or enclosure that encloses materials and/or structures used to process, treat, filter and/or react with a fluid (e.g., process fluid, process byproduct, etc.) such as a liquid or gas, for example, that flows therethrough. As described in the examples disclosed herein, the process chambers may be of any appropriate shape and have any arrangement of trays to process the fluid. In particular, the trays of the process chamber may be arranged in a vertical configuration relative to one another (e.g., in series or sequential arrangement), in a horizontal arrangement to one another (e.g., in parallel to one another, etc.), a diagonal arrangement, any other appropriate spatial arrangement, or any combination of the aforementioned positional arrangements.

As used herein, the term "bulk material" refers to discrete bulk material, which may be numerous objects (e.g., grains, flakes, pellets, balls, disks, saddles and/or rings etc.) that are placed and/or randomly distributed (e.g., stacked and/or piled) in a container or vessel, and in which fluid (e.g., liquid and/or gas) may flow around, through, within or between. The bulk material, for example, may include, but is not limited to, discrete pieces (e.g., grains) of irregular and/or regular shaped solid material, saddle-type, ball-type, disk-type or ring-type material and/or ground material, etc. The bulk material may consist of grains of a specified size, a distribution of sizes and with or without specified shapes, for example. In particular, the bulk material may be composed of ceramic, glass or glass-like materials, plastics, catalyst material and/or treated to be catalytically active (e.g., crystallization, vapor deposition and/or other coating or plantation techniques, etc.). The bulk material further may comprise or consist of catalytic and/or catalytically activated material, in which catalytic material is catalytically active in some chemical regime by itself, whereas catalytically activated material is or consists of a base material that is treated to become catalytically active in some chemical regime. The "catalytic activation" can thereby comprise of a doping process (e.g. addition of a catalyst to the base structure of the bulk material) and/or a surface treatment process (e.g. surface deposition, coating, depletion, etc.) and/or chemical, electrochemical, and/or some other conversion process to increase a catalytic activity of the underlying base material of the bulk material.

As used herein, the term "flow director" refers to a geometric feature or a device or structure to divide and/or re-direct fluid flow. A geometric feature may include, but is not limited to, an annular gap, a shape of a vessel, a guide, etc. A device or structure may include, but is not limited to, openings, pipes, valves, flaps and/or guiding elements such as spoilers, baffles, ducts, orifices or deflecting plates, etc.

As used herein, "treating a fluid" may refer to processing, reducing compounds and/or purifying a fluid by physical principles (e.g., absorption, adsorption, filtration, thermal diffusion, gravity, inertia, heat transfer, electric and/or magnetic forces), a chemical (e.g., a reactant, a catalyst) and/or a chemical reaction (e.g., a catalytically supported chemical reaction), for example. As used herein, "treating a fluid" may also refer to a treatment of a fluid that may involve a change of an overall chemical composition of the fluid, filtration, fractioning and/or separation, etc.

Figure 1:
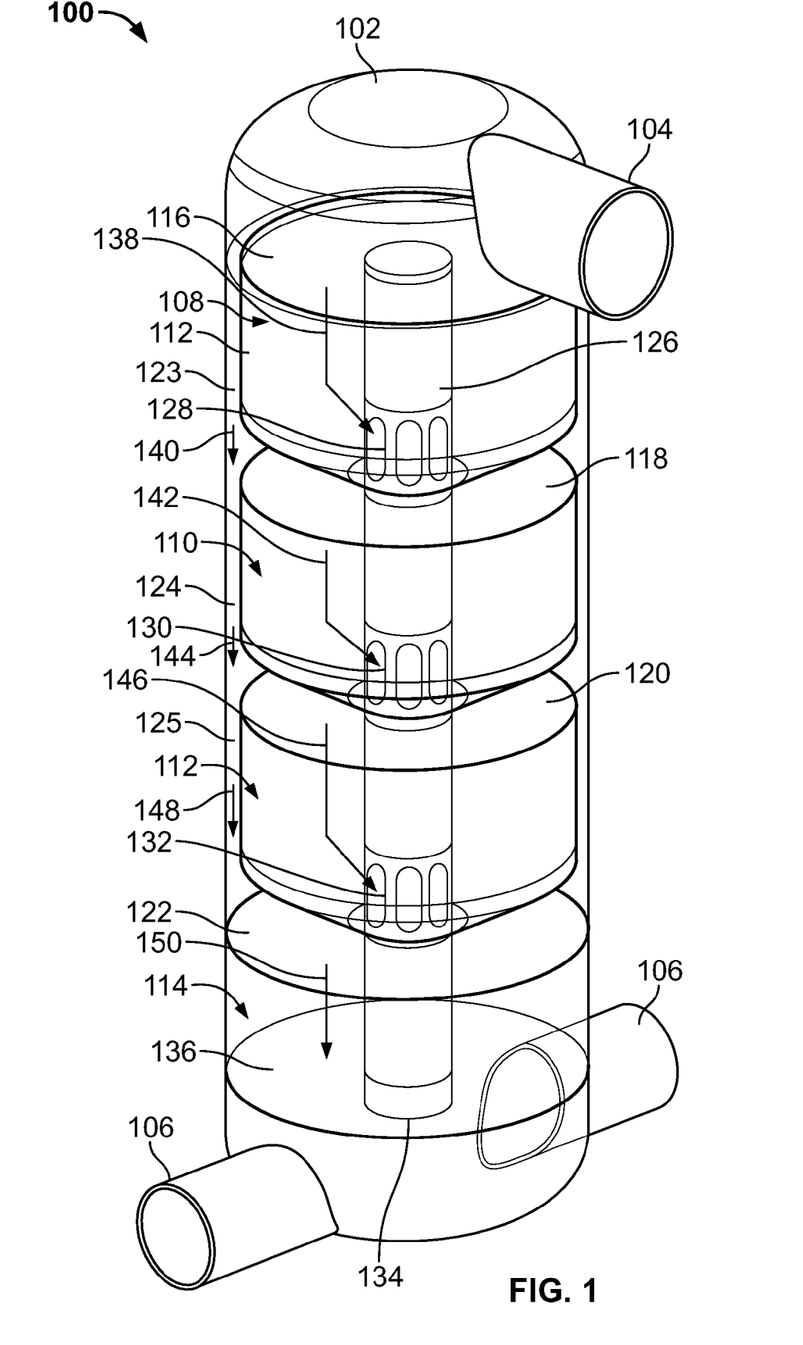
FIG. 1 illustrates an example crossflow reactor in accordance with the teachings of this disclosure.

As set forth herein, FIG. 1 illustrates an example crossflow reactor 100 in accordance with the teachings of this disclosure. The example crossflow reactor 100 includes a process chamber (e.g., a housing, a vessel, an enclosure, an outer surface, etc.) 102, an inlet (e.g., a fluid inlet) 104, outlet(s) (e.g., fluid outlets, exhausts, etc.) 106, trays (e.g., catalyst trays, cylindrical trays with a semi-conically or tapered portion, etc.), 108, 110, 112 a bottom tray (e.g., a bottom catalyst tray) 114, which are generally cylindrically-shaped in this example. The trays 108, 110, 112, 114 of the illustrated example contain bulk material (e.g., randomly distributed material). The bulk material stored within the trays 108, 110, 112, 114 may be saddle-type, ball-type catalyst, disk-type, ring-type catalyst, and/or any other appropriate type of solid bodies. In some preferred examples, the bulk material consists of or comprises a bulk catalyst and/or a catalytically activated bulk material. In this example, the trays 108, 110, 112 are substantially identical from a geometric perspective (e.g., the same design and/or dimensions, etc.).

The trays 108, 110, 112, 114 of the illustrated example each have top surfaces 116, 118, 120, 122, respectively, each of which is perforated to allow fluid to flow therethrough. In this example the top surfaces 116, 118, 120, 122 are removable covers. The example trays 108, 110, 112 have a generally cylindrical shape with a semi-conical taper and define respective annular gaps 123, 124, 125, respectively, around their periphery with respect to the chamber 102. In this example, the trays 108, 110, 112 are in fluid communication with a central return (e.g., a central pipe) 126 via openings (e.g., cross flow openings, return openings, etc.) 128, 130, 132, respectively. In this example, the central return has a bottom surface (e.g., exit opening(s)) 134 in fluid communication with the outlet(s) 106. The bottom tray 114 of the illustrated example also has a bottom perforated surface 136 to allow fluid to flow therethrough and does not have an annular gap in contrast to the trays 108, 110, 112 (e.g., the top surface 122 is sealed to an inner wall of the process chamber 102). The central return 126 of the illustrated example is one example of a flow collector or return.

In operation, fluid (e.g., process fluid, process gas, process liquid, etc.) is provided to the inlet 104 and flows generally in a direction downward towards the outlet 106. Consequently, at least a first fluid partial stream (e.g., a first portion, a first divided stream, etc.) divided from the inlet flow moves towards the top surface 116 of the first tray 108, thereby flowing into the tray 108 via perforations, grating and/or any type of opening(s) present on the top surface 116 to allow the fluid to flow therethrough and then through catalyst material contained within the tray 108 to process the fluid. An arrow 138 generally indicates a flow direction of the first fluid partial stream. After the first fluid partial stream flows through the top tray 108 and is treated by the catalyst material, the first fluid partial stream is then directed towards the central return 126 via the opening 128. While the first fluid partial stream flows is divided from the inlet flow, a second fluid partial stream of the fluid is also divided from the inlet flow and bypasses the first tray 108 by flowing around the first tray 108 as generally indicated by the arrow 140, thereby flowing through the annular gap 123 and towards the tray 110.

The second fluid partial stream is then further divided into additional third and fourth fluid partial streams. Similar to the flow division corresponding to the top tray 108, the third fluid partial stream flows into the tray 110 to pass through catalyst material within the tray 110 and enter the central return 126 via the opening 130, as generally indicated by an arrow 142, while the fourth fluid partial stream bypasses the tray 110 and flows through the annular gap 124 surrounding the second tray 108 towards the tray 112, as generally indicated by an arrow 144. In this example, dividing the overall fluid flow into the second and fourth partial streams through the trays 108 and 110, respectively, enables relatively equal flows through the trays 108 and 110, thereby allowing more efficient flow through the crossflow reactor by reducing pressure drops that would have been encountered if the inlet flow and/or the partial streams had not been subdivided.

In some examples, subdividing partial streams allows at least a portion of adjacent trays to have substantially similar flow rates. Additionally or alternatively, subdividing the fluid flow may result in substantially similar flow rates throughout the entire crossflow reactor (e.g., a topmost tray has a substantially similar flow rate to a tray at the bottom). As used herein, "substantially similar" means that a volumetric flow rate, fluid velocity or pressure ratio between two fluid flow partial streams, which may be adjacent or not, may be equal to a range of approximately 0.5 to 1.5, preferably to a range of approximately 0.75 to 1.25, and even more preferred to a range of at least 1.0±10% or better.

In contrast to substantially similar flow rates through individual trays of the crossflow reactor 100 disclosed herein, in some alternative applications of the invention defined and/or definable and/or adjustable flow rates ratio among the individual trays of the crossflow reactor 100 might be beneficial. Adjustable flow rates will especially allow for a better control of the overall performance of the crossflow reactor 100 if performance characteristics of the individual trays evolve with some spread and/or non-homogeneously over time. In addition, individual trays maybe shut down from processing incoming fluid by a mechanical device (e.g., a bypass valve), for example, to adjust the flow ratios to allow for individual maintenance of this tray, especially bulk material inside this tray (e.g. cleaning and/or reactivation process to be applied to the bulk material, replacement of the bulk material, etc.).

Similarly, a fifth partial stream of the illustrated example flows into the tray 112, as generally indicated by an arrow 146, and a sixth partial stream bypasses the tray 112 and flows through the annular gap 125 surrounding the third tray 112, as generally indicated by an arrow 148, and towards the top surface 122 of the bottom tray 114, which does not have an annular gap with respect to the chamber 102. The sixth partial fluid stream then flows towards the bottom tray 114 and through the bulk catalyst material contained within the bottom tray 114 and through the bottom surface 136, as generally indicated by an arrow 150. The sixth partial fluid stream exits out of the crossflow reactor 100 via the outlets 106. In particular, the flow exiting the bottom tray 114 combines with a flow from the central return 126.

In some examples, the ratio between each of the diameter of the trays 108, 110, 112 to an inner diameter (e.g., an interior diameter, a chamber diameter etc.) of the chamber 102 may range from 0.6 to 0.99, preferably from 0.8 to 0.99. The amount of flow directed into annular gaps surrounding the trays may differ based on the perforations and/or gratings used on the inlet top surfaces 116, 118, 120, 122 of the trays 108, 110, 112, 114, respectively, and/or the bottom surface 134 of the tray 114. It has been generally observed that a substantially similar flow results from dividing the partial streams around or through the trays 108, 110, 112, through the bottom tray 114 and/or through the return 126. In particular, in some examples, a flow rate ratio between an annular gap of a tray and the amount flowing through the respective tray may range from 0.2 to 1. In some examples, a flow rate ratio may be approximately 0.25 (e.g., 25% of the flow flows into the tray and 75% flows into the respective annular gap around the tray). The ratios described are only illustrative examples and may vary accordingly. The flow rate ratios per tray may or may not depend on the number of trays in a special embodiment according to the present examples and, thus, the examples disclosed herein are not limited to the number of trays shown in the illustrated examples. While the partial streams are shown being divided into sequential trays, in some examples, the partial streams may be directed to non-sequential trays (e.g., a partial stream bypasses a first tray and then is directed to a fourth tray in sequence via a conduit and/or flow re-director, etc.).

In some examples, the trays 108, 110, 112, 114 have similar or the same heights and/or amounts of catalyst contained within. In other examples, the trays 108, 110, 112, 114 have differing heights and/or amounts of catalyst contained within to maintain a relative determination of the filling height (e.g., the tray 114 has an approximately 2-10% higher filling height than the trays 108, 110, 112, etc.). In this example the trays 108, 110, 112 have approximately 1150 mm in height of bulk material (e.g., bulk catalyst material) while the tray 114 has approximately 1225 mm in height of bulk material (e.g., bulk catalyst material). The dimensions shown in the illustrated examples are only dimensions and, thus, may vary greatly with respect to an application and/or a specific process.

By dividing the flow into partial streams and directing the partial streams toward different trays, the crossflow reactor 100 allows effective flow (e.g., relatively low loss flow) through the trays 108, 110, 112, 114 without significant pressure losses along an overall length of the crossflow reactor 100. Separating the bulk material (e.g., bulk catalyst material) into separate trays allows significantly less pressure-loss along a corresponding length of the crossflow reactor 100 and avoids crushing of the bulk material catalyst, which can further lead to additional pressure loss and/or velocity loss of the fluid. In particular, a critical height to weight ratio is met to prevent the catalyst material from crushing. It has been determined that in some examples, a desirable range of height to weight may range from 0.0 to 2.0. The central return 126 of the illustrated example also facilitates reduction of pressure losses by providing a relatively low-loss central conduit for fluid to flow therethrough once the fluid has passed and/or been processed through the trays 108, 110 and 112.

While each of the trays 108, 110, 112 of the illustrated example define substantially uniform annular gaps relative to the chamber 102, in other examples, the annular gaps surrounding the trays 108, 110, 112 may vary (e.g., narrow or widen) along a longitudinal length of the crossflow reactor 100 and/or the annular gaps around the trays 108, 110 112 may be different from one another. While annular gaps of the illustrated example are used as distribution devices to re-direct or divide the flow into partial streams, any appropriate type of flow director may be used to divide the partial streams and/or direct the partial streams towards their respective trays 108, 110, 112 and/or 114. Some examples may use distribution devices including, but not limited to, openings, pipes, valves, flaps and/or guiding elements such as spoilers, baffles, ducts, orifices or deflecting plates, etc. While the trays 108, 110, 112 are generally identical in this example, the geometries, shapes, sizes, types and/or quantities of the trays 108, 110, 112 may vary relative to one another. In particular, the trays 108, 110, 112 and/or 114 may have varying geometries and/or have differing amounts of bulk material (e.g., bulk catalyst material) within to more evenly distribute flow between the trays 108, 110, 112 and/or 114.

Figure 2A:
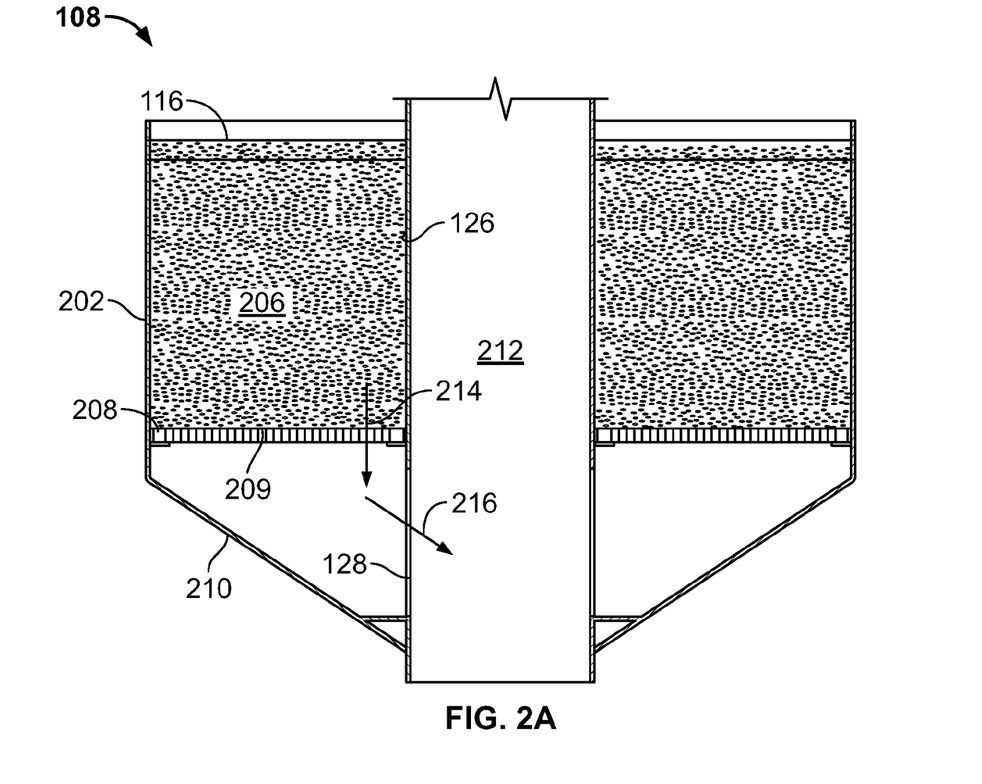
FIG. 2A illustrates a cross-sectional view of an example tray and a portion of a return of the example crossflow reactor of FIG. 1.

FIG. 2A illustrates a cross-sectional view of the example tray 108 and a portion of the example return 126 of the example crossflow reactor 100 of FIG. 1. As described above in connection with FIG. 1, the tray 108 has a top surface 116, which is perforated in this example. The tray 108 of the illustrated example also has an outer cylindrical wall 202 defining a catalyst storage compartment 206, a grated platform 208, a second perforated surface 209, a conical portion 210, which is in fluid communication with a return chamber 212 (e.g., a central opening of the return 126, etc.) via the opening 128. While the return 212 of the illustrated example is shown in a central location of the reactor 100, the return 212 may be located off-center or any appropriate position within the reactor 100. The return chamber 212 of the illustrated example is another example of a flow collector or return.

In this example, the perforated top surface 116 prevents the bulk material (e.g., bulk catalyst material) stored in the catalyst storage compartment 206 from flowing and/or displacing out of the tray 108. In some examples, ball-type catalyst contained within the tray 108 may be approximately 1/8" to 3/16" in size and light enough to come out of the tray 108 with even minimal fluid movement or fluctuations of fluid within and, thus, the top surface 116 prevents the catalyst from flowing out of the tray 108. The grated platform 208 of the illustrated example has the perforated surface 209 positioned above in the orientation of the viewing direction of FIG. 2A. The perforated surface 209 may have a perforation pattern, which is similar or identical to the grated top surface 116, to prevent the bulk material (e.g., bulk catalyst material) of the storage compartment 206 from flowing into the central return 212. In other examples, the perforated surface 209 is below the grated platform 208. In some examples, the grated platform 208 provides mechanical and/or structural support for the bottom perforated surface 209. In some examples, the central return 126, the grated platform 208 and/or the perforated surface 209 is coupled (e.g., welded) to the tray 108, for example.

In operation, a partial fluid stream flows into the tray 108 through perforations of the top surface 116 and towards the conical section 210 in a direction generally indicated by an arrow 214 and into the central return opening 212 via the opening 128, as generally indicated by an arrow 216. In particular, the partial fluid stream enters the tray 108 via openings (e.g., perforations, gratings, circular openings and/or rectangular openings, hexagonal openings, etc.) of the top surface 116, passes through the bulk material (e.g., bulk catalyst material) stored within in the catalyst storage compartment 206 and then passes through the perforated surface 209 and through the grated platform 208 to enter the conical section 210, which does not contain bulk material (e.g., bulk catalyst material) in this example. After the partial stream flows into the central return 212, the partial stream heads downward through the central return 212 towards the outlets 106. The height and/or width of the catalyst storage compartment 206 of the illustrated example may be designed and/or specified to meet necessary requirements for the catalyst material (e.g., height to weight ratio, necessary residence time and/or maximum allowable pressure drop requirements, etc.).

In this example, to maintain height to diameter ratio of the tray 108 at approximately 0.7, the tray 108 is sized to approximately 2000 mm (millimeters) in overall height and has an approximate diameter of 2800 mm. While the tray 108 is shown as semi-conical or cylindrical shape, any appropriate shape may be used including, but not limited to, rectangular, spherical, cylindrical, parallelogram, etc. In some examples, the tray 108 of the illustrated example may have a discharge device (e.g., a drain), a filling device (e.g., another inlet), a heating or cooling device, and/or a regeneration device. In some examples, the tray 108 may route the partial stream within the storage compartment 206, to another tray, to an inlet device, to a distribution device (e.g., a fluid distribution device), and/or to be cooled and/or heated. In some examples, fluid within the tray 108 and/or external to the tray 108 is measured and/or controlled for concentrations of compounds to be removed, etc.

Figure 2B:
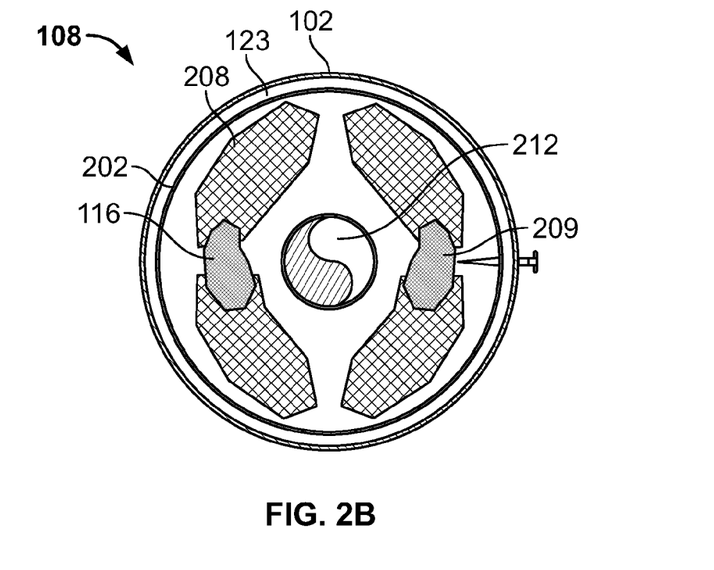
FIG. 2B illustrates a partial cross-sectional view of the crossflow reactor of FIG. 1 along a longitudinal direction of the crossflow reactor.

FIG. 2B illustrates a partial cross-sectional view of the reactor 100 of FIG. 1 along a longitudinal direction of the reactor 100. As can be seen from this view, the chamber 102 and the outer cylindrical wall 202 of the tray 108 define the annular gap 123 to allow a partial fluid stream to flow therethrough.

In this example, the grated platform 208 has wider openings than perforations on the top surface 116 and/or the perforated surface 209 adjacent the grated platform 208. Further, the grated platform 208 of the illustrated example has relatively greater thickness than the perforated top surface 116 and the perforated surface 209. In some examples, the perforations of the top surface 116 and/or the perforated surface 209 may be square-shaped, hex-shaped, oval-shaped, slot-shaped, triangular shaped, pentagonal shaped or honeycomb shaped, etc.). In some examples, the diameter of the central return 212 varies along the length of the crossflow reactor 100.

Figure 3:
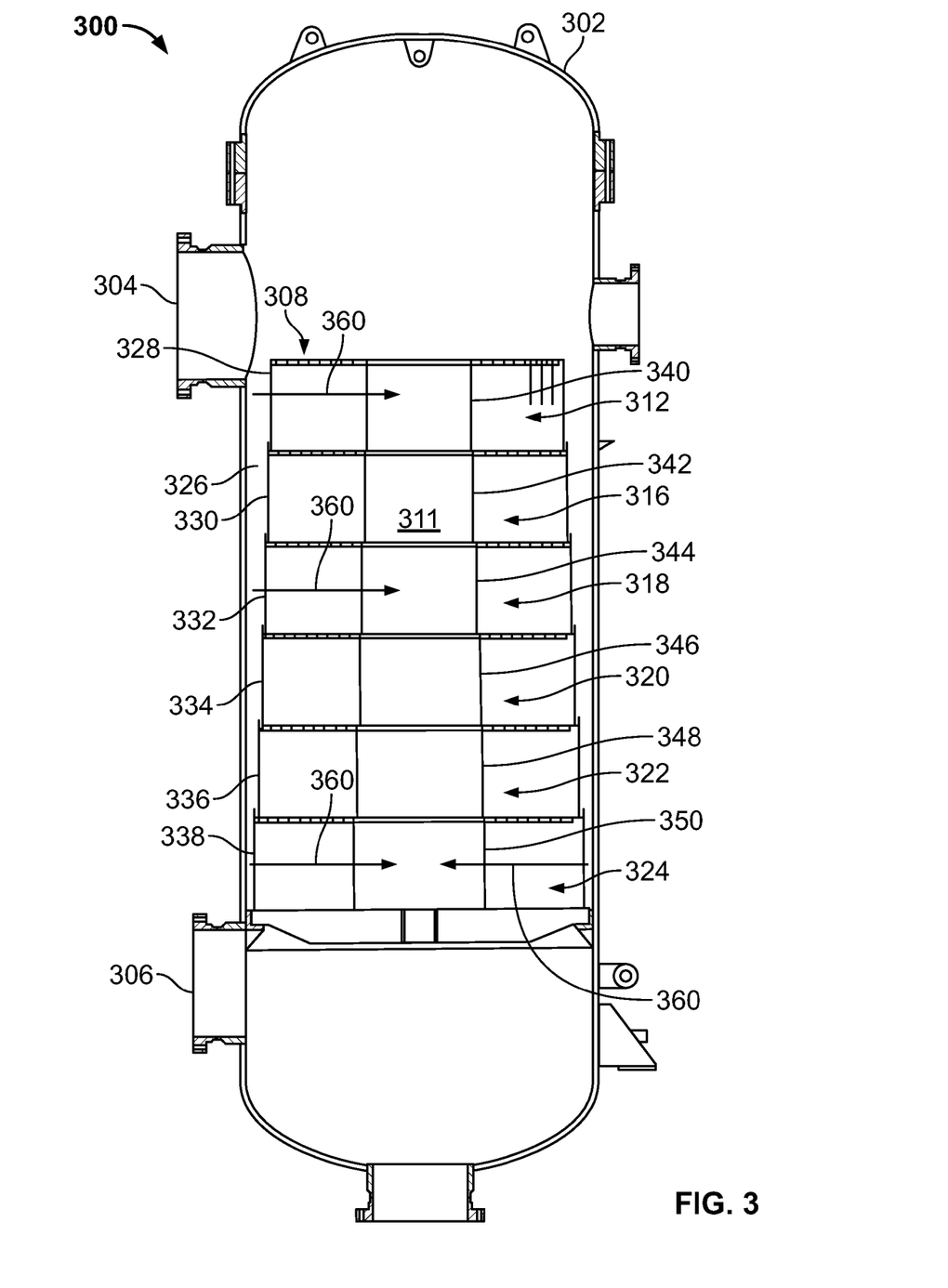
FIG. 3 illustrates a cross-sectional view of another example crossflow reactor in accordance with the teachings of this disclosure.

FIG. 3 illustrates a cross-sectional view of another example crossflow reactor 300 in accordance with the teachings of this disclosure. The example crossflow reactor 300 includes a chamber (e.g., a housing, an enclosure, a process chamber, etc.) 302, an inlet 304, an outlet 306, and a tray assembly 308. In this example, the tray assembly 308 includes storage trays (e.g., annular shaped storage trays, annular ring shaped storage trays, etc.) 312, 316, 318, 320, 322, 324 and defines a central return (e.g., a central channel) 311. In this example, the tray assembly also includes mechanical mounts and/or parts (e.g., mounting struts, lips and/or flanges on top of the trays 312, 316, 318, 320, 322, 324) to support the trays 312, 316, 318, 320, 322, 324 in a vertical stack and/or to mount the trays 312, 316, 318, 320, 322, 324 to the chamber 302. The bulk material (e.g., bulk catalyst material) storage trays 312, 316, 318, 320, 322, 324 going in a direction downward as viewed in the orientation of FIG. 3, have increasing diameters and, thus, a decreasing annular gap 326 with respect to the chamber 302 in a downward direction of the orientation shown in FIG. 3. In some examples, an annular gap is relatively constant or increases instead in a direction towards an outlet. Additionally, in this example, the central return 311 increases in diameter in the indicated downward direction. In some examples, the central return may be relatively constant or even decrease in diameter instead.

The bulk material (e.g., bulk catalyst material) storage trays 312, 316, 318, 320, 322, 324 of the illustrated example store bulk material, which are ring-type catalyst in this example. Other bulk material, (e.g., bulk catalyst material) configurations may be used. Each of the bulk material (e.g., bulk catalyst material) storage trays 312, 316, 318, 320, 322, 324 of the illustrated example have perforated outer annular surfaces 328, 330, 332, 334, 336, 338, respectively, to allow the fluid in the annular gap surrounding the trays 312, 316, 318, 320, 322, 324 to enter therethrough and be processed by bulk material (e.g., bulk catalyst material). The trays 312, 316, 318, 320, 322, 324 of the illustrated example also have inner annular surfaces 340, 342, 344, 346, 348, 350, respectively, which are also perforated.

In operation, fluid (e.g., process fluid) enters the inlet 304 and then the fluid flows through the annular gap 326 and is subdivided into partial fluid streams that flow towards and into the trays 312, 316, 318, 320, 322, 324, thereby distributing the fluid flow through multiple trays via the partial fluid streams to reduce pressure losses and/or bulk material, (e.g., bulk catalyst material) crushing, for example. Arrows 360 of the illustrated example generally indicate flow paths into the trays 312, 316, 318, 320, 322, 324. Each partial stream enters the trays 312, 316, 318, 320, 322, 324 via the outer annular surfaces 328, 330, 332, 334, 336, 338, which are perforated in this example, and passes through the respective bulk material (e.g., bulk catalyst material) storage areas to be processed by the bulk material (e.g., bulk catalyst material) stored within. The partial streams then pass though the respective inner annular openings 340, 342, 344, 346, 348, 350 of the respective trays to enter the central return 311, in which the partial streams combine and exit the crossflow reactor 300 via the outlet 306. In some examples, the trays 312, 316, 318, 320, 322, 324 and/or a portion thereof may be in fluid communication with one another (e.g., there may be perforated surfaces between the stacked trays 312, 316, 318, 320, 322, 324).

Similar to the crossflow reactor 100 of FIG. 1, the crossflow reactor 300 allows separate trays of catalyst to receive partial streams to avoid significant pressure and/or velocity losses of the overall flow. Additionally, maintaining the bulk material (e.g., bulk catalyst material) with a specific height to weight ratio such as a ratio of 0.0 to 2.0, for example, reduces and/or eliminates crushing of the bulk material (e.g., bulk catalyst material).

Figure 4A:
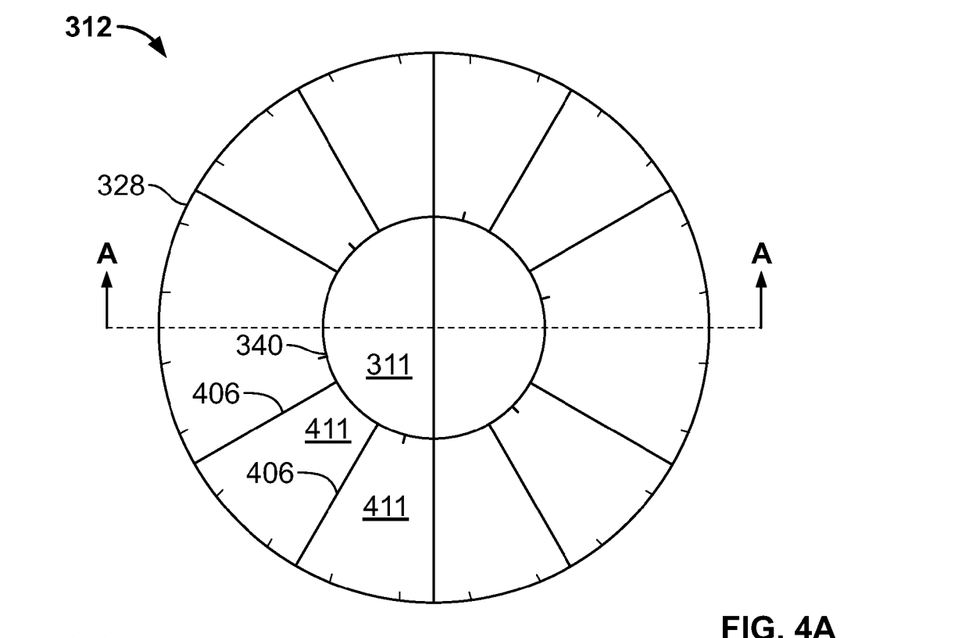
FIG. 4A is a cross-sectional view of an example tray of the crossflow reactor of FIG. 3.

FIG. 4A is a cross-sectional view of an example tray 312 of the crossflow reactor 300 of FIG. 3 along a longitudinal direction of the crossflow reactor 300. As described above in connection with FIG. 3, the tray 312 of the illustrated example includes the outer annular surface 328, which is perforated in this example, an inner perforated annular surface 340 that defines the inner chamber (e.g., central return, return pipe, etc.) 311, and spans (e.g., supports, span supports, etc.) 406, which couple (e.g., structurally couple, mechanically couple, etc.) the outer annular surface 328 to the inner annular surface 340. The outer annular surface 328, the spans 406 and the inner annular surface 340 define bulk material storage areas 411 where bulk material (e.g., bulk catalyst material, ring-type catalyst) is stored. In some examples, the spans 406 are perforated. The perforated surfaces of the outer annular surface 328 and the inner annular surface 340 allow a radial cross flow from the outer annular surface 328 to the inner chamber 311, which is a central return to the outlet 306 in this example.

Figure 4B:
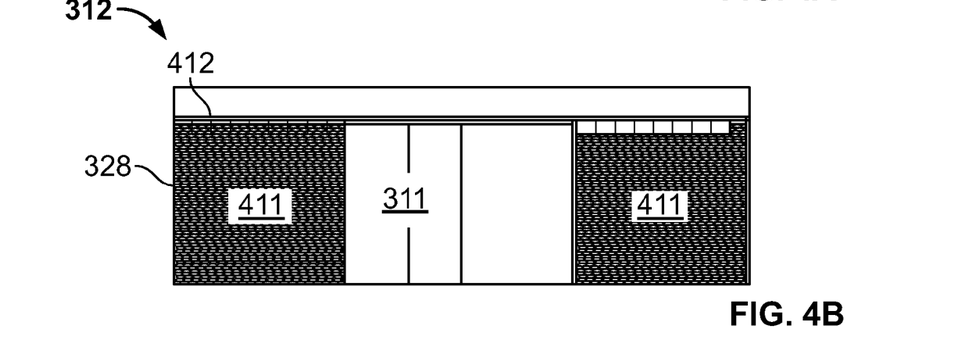
FIG. 4B is another cross-sectional view of the example tray of FIG. 3 along the line A-A of FIG. 4A.

FIG. 4B is another cross-sectional view of the example tray 312 of FIG. 3 along a line A-A of FIG. 4A. In this view, the central chamber 311 and the bulk material storage areas (e.g., bulk catalyst material storage areas) 411 are shown. Additionally, a top surface (e.g., a removable top surface) 412 of the illustrated example is generally flat and does not have perforations or grating, thereby directing the cross flow of the fluid in a generally radially inward direction (e.g., crossflow towards the center of the tray 312, etc.), in contrast to the at least partial vertical flow shown above in connection with the example reactor 100 described above in connection with FIG. 1. In this example, the tray 312 has a height of approximately 800 mm (millimeters), a diameter of about 2750 mm and an inner diameter of approximately 950 mm, but these dimension may vary in other examples and are only mentioned for this illustrative example.

Figure 4C:
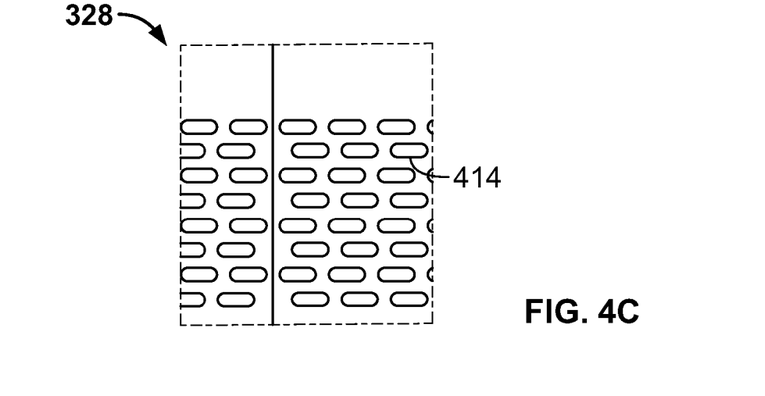
FIG. 4C is a detailed view of the outer surface of the example tray of FIG. 3.

FIG. 4C is a detailed view of the outer annular surface 328 of the example tray 312 of FIG. 3. In this example, perforations 414 of the outer annular surface 328 are approximately 8 mm long with a corresponding radius of 2 mm. In some examples, perforations may be spaced approximately 4 mm apart from one another. In some examples, the positions and/or spacing of the perforations 414 may vary along different directions of the tray 312 to control the flow through the tray 312. The perforations on the inner annular surface 340 may also have similar dimensions. In order to select appropriate perforation sizes (e.g., perforation diameters) for a certain type of bulk material, in some examples, it is common to take into account bulk material size distribution (e.g., the smallest diameter of the bulk material) and/or pressure distributions, etc.

In some examples, the size and/or spacing of the perforations of the inner annular surface 340 may vary from the outer annular surface 328 to control the reaction (e.g., residence time, laminarity of the flow and/or flow distribution, etc.) of the fluid flowing through the bulk material contained in the bulk material (e.g., bulk catalyst material) storage areas 411. While certain example dimensions are described above, any appropriate dimension, geometric arrangement, spatial arrangement and/or opening geometry may be used for any of the perforations or grating.

Figure 5:
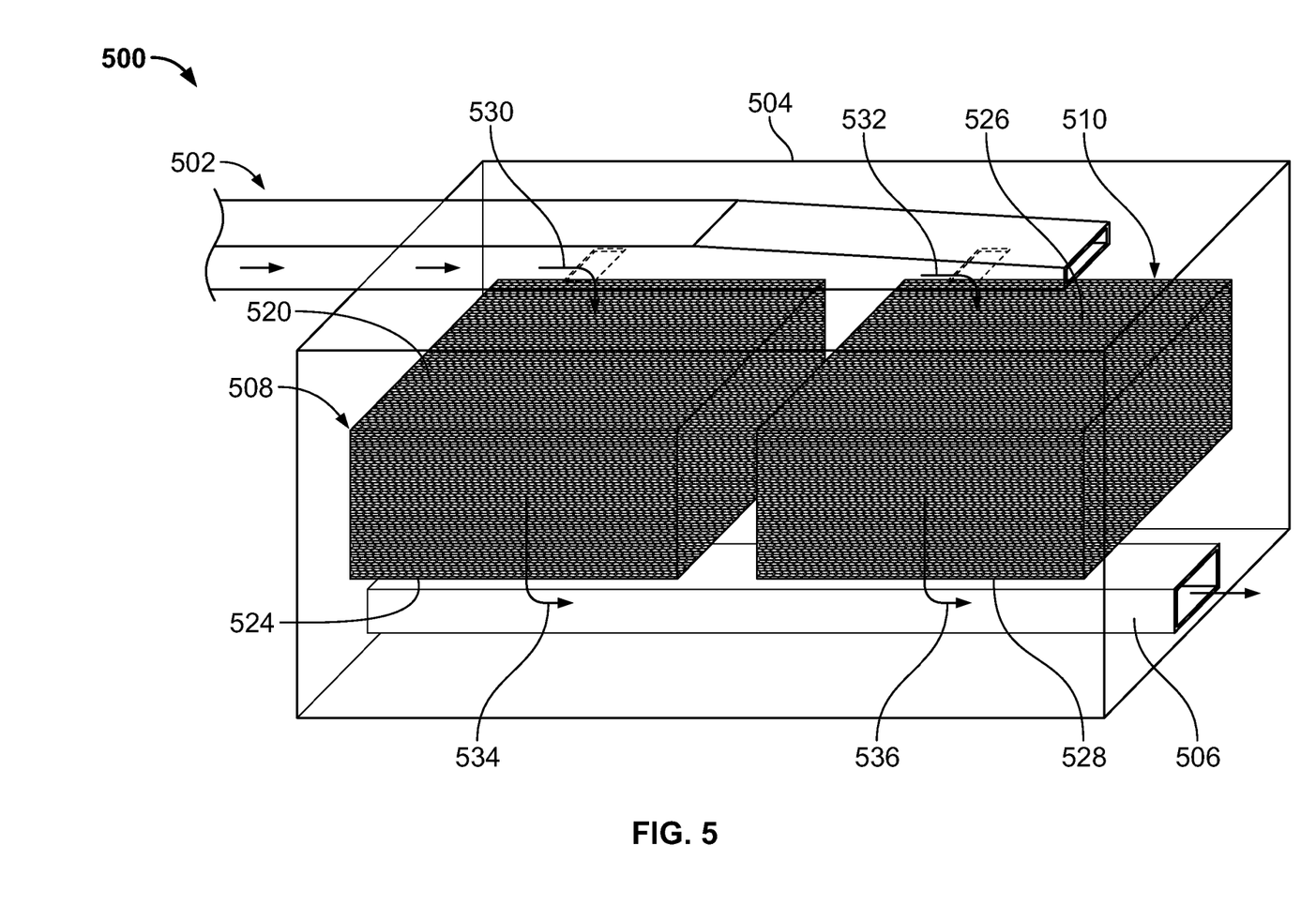
FIG. 5 illustrates an example crossflow reactor in a horizontal configuration.

FIG. 5 is an example of another example crossflow reactor 500, which is operated in a horizontal orientation. The crossflow reactor 500 of the illustrated example includes an inlet channel 502 leading to an enclosure 504, an outlet channel 506 leading out of the enclosure 504 and trays 508, 510 disposed within the enclosure 504. The tray 508 has a top surface 520 and a bottom surface 524. Likewise, the tray 510 has a top surface 526 and a bottom surface 528.

In operation, fluid to be treated by the cross flow reactor 500 is provided to the inlet channel 502 and flows towards outlets 530, 532 and into the trays 508, 510 to be treated by bulk material stored therein. In this example, the inlet channel 502 has a decreasing cross-section in a direction towards the outlet 532. As the fluid moves out of the outlet 530, it passes through the top surface 520, which may be perforated or have a single opening, for example, and into the tray 508 where it is treated by bulk material in the tray 508. Likewise, fluid from the outlet 532 flows into the tray 510 via the top surface 526 to be treated by bulk material in the tray 510. The treated fluid from the trays 508, 510 exits through the bottom surfaces 524, 528 of the trays 508, 510, respectively and flows into the outlet channel 506 in which the treated fluid exits the example crossflow reactor 500.

Figure 6:
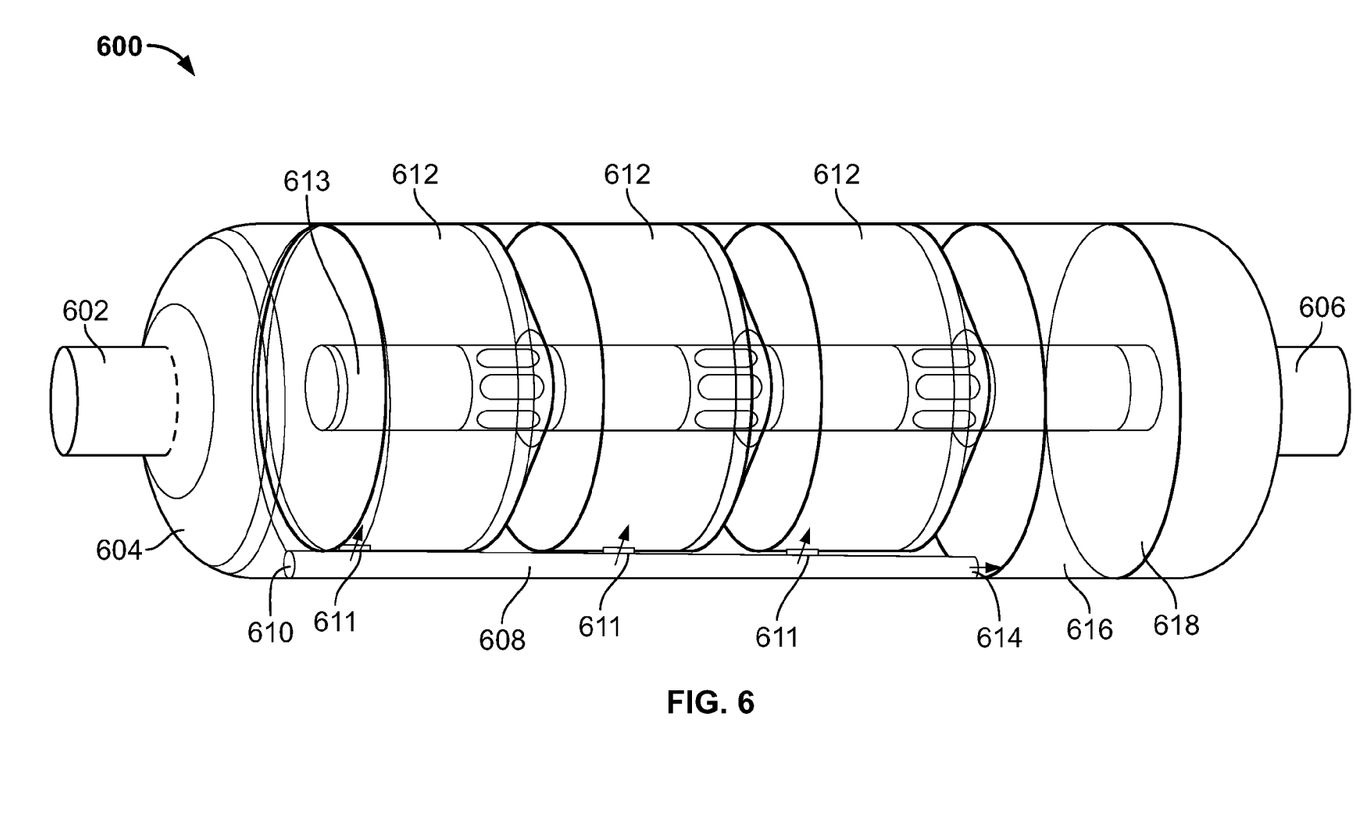
FIG. 6 illustrates another example cross flow reactor in a horizontal configuration.

FIG. 6 is an example of another example crossflow reactor 600, which is similar to the example crossflow reactor 100 of FIG. 1, but in a horizontal configuration. In contrast to the crossflow reactor 100, the example crossflow reactor 600 has an inlet 602 leading to an enclosure (e.g. a housing a vessel, etc.) 604 and an outlet 606 exiting the enclosure 604. In this example, the inlet 602 and the outlet 606 are substantially parallel to a general direction of flow through the enclosure 604. In contrast to the crossflow reactor 100, the crossflow reactor has one or more conduits 608 with conduit inlets 610 and conduit outlets 611 leading to trays 612 that contain bulk material to treat the fluid and fluidly communicate with a return 613 that is capped near the inlet 602 and open near the outlet 606. The conduits 608 also include an outlet 614 for fluid to flow into a final tray 616 with a perforated exit surface 618. In this example, the conduits 608 have a decreasing cross-section and/or diameter in a direction towards the outlet 606.

In operation, fluid flows into the inlet 602 and flows into the conduits 608 via the inlets 610. The fluid then flows through the conduits 608 and a portion of the fluid flows through the trays 612 to be treated by the bulk material contained within each of the trays 612. Another portion of the fluid flows to the outlet 614, into the final tray 616, which also contains bulk material, and out of the final tray via the perforated exit surface 618 to converge with fluid from the return 613 before exiting the crossflow reactor via the outlet 606.

In this example, the trays 612, 614 are filled and/or partially filled with the bulk material prior to being placed into the crossflow reactor 600. Additionally or alternatively, the trays 612, 614 have accessible doors (e.g., maintenance doors) to access and/or service the bulk material in the trays 612, 614 while the trays 612, 614 are within the enclosure 604. Additionally or alternatively, the enclosure 604 has openings (e.g., doors, access doors, etc.) to access the trays 612, 614 and/or access doors of the trays 612, 614. While the trays 612, 614 of the illustrated example have a substantially round shape, in some examples, the trays 612, 614 have a rectangular shape.

Figure 7:
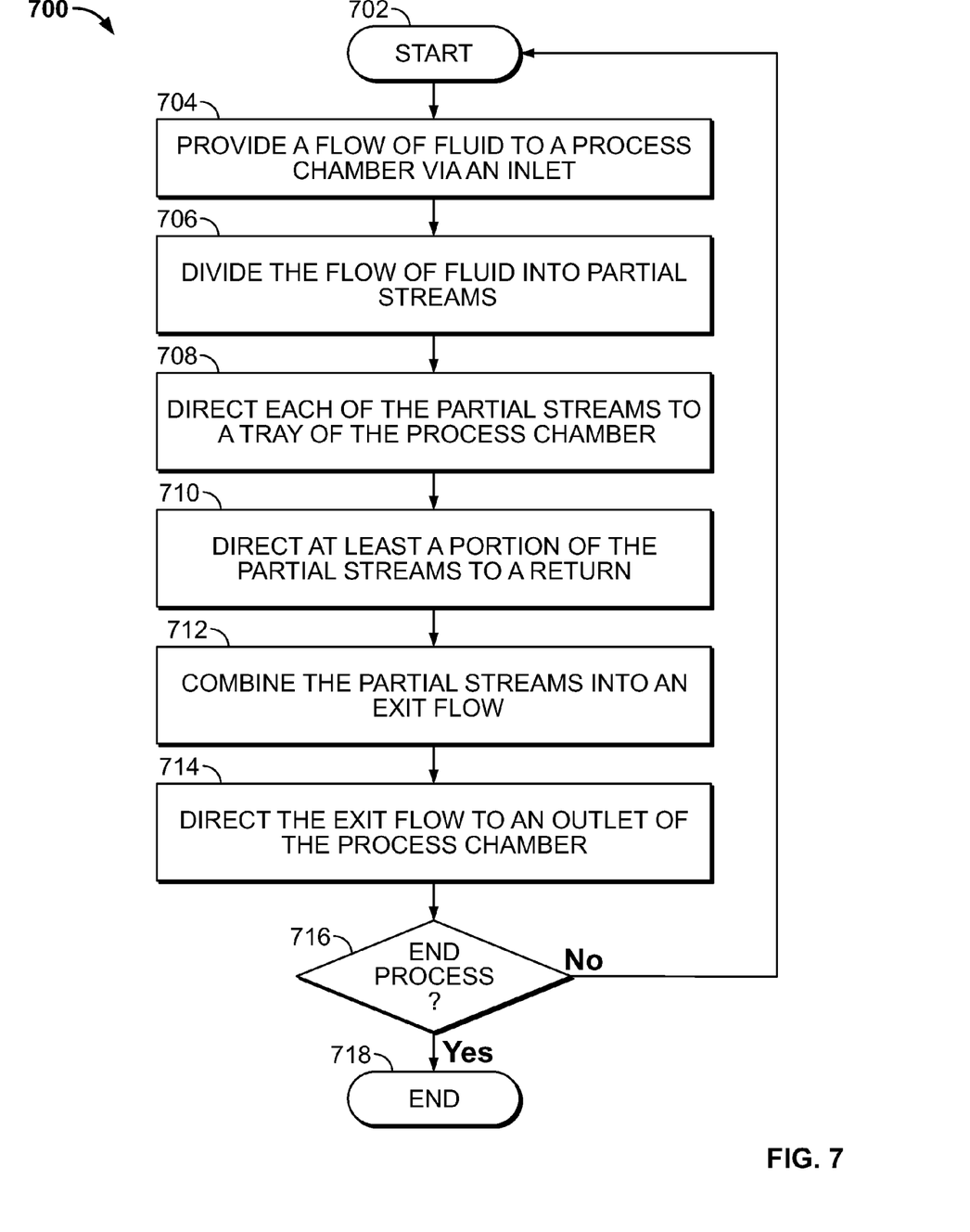
FIG. 7 is a flow diagram of an example method in accordance with the teachings of this disclosure.

FIG. 7 is a flow diagram of an example method in accordance with the teachings of this disclosure. The example process 700 of FIG. 7 begins when a fluid from an industrial process (e.g., combustion, steam-driven by combustion, etc.) is to be treated (e.g., processed through catalyst material, etc.) (block 702). The fluid is provided to a process chamber (e.g., the process chamber 102, the process chamber 302, the process chamber 504, the process chamber 604) via an inlet (e.g., the inlet 104, the inlet 304, the inlet channel 502, the inlet 602, etc.) of the process chamber (block 704).

The flow is then divided into partial streams (block 706). The division of the partial streams may occur through annular gaps around trays of the process chamber such as shown with the example crossflow reactors 100 and 300, for example. In this example, at least two of the partial streams directed to adjacent trays have predefined, adjusted and/or adjustable flow rates and/or flow ratios. In some examples, devices such as baffles, pipes and/or flow redirectors, etc. are used to divide and/or further direct the partial streams. In some examples, the general positions of the trays of the process chamber relative to one another define the flows and/or division of the flows into partial streams (e.g., trays positioned parallel to one another, etc.).

The partial streams are then directed to their respective trays (block 708). In particular, the partial streams of the fluid flow are moved into their respective trays to be treated by flowing through bulk material (e.g., bulk catalyst material) contained within the trays, for example.

In some examples, at least a portion of the partial streams, after flowing through their respective trays, are directed to a return such as the central return 212 of FIG. 2A, the central return 311 of FIG. 3, or the central return 613 of FIG. 6 (block 710). In some examples, the partial streams that have flowed through their respective trays are then combined prior to exiting the process chamber into a combined exit flow (block 712). In some examples, the combined exit flow is directed towards an outlet of the process chamber (block 714). Next, it is determined if the process should end (block 716). If the process is determined to end (block 716), the process ends (block 718). Alternatively, if the process is not determined to end (block 716), the process repeats (block 702).

From the foregoing, it will appreciate that the above disclosed methods and apparatus enable crossflow reactors that use inexpensive bulk material to treat fluids with minimal pressure and/or velocity losses.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a process chamber having an inlet and an outlet to allow a flow of fluid to flow therethrough;
   a plurality of trays disposed within the process chamber, and containing bulk material to treat the fluid, the plurality of trays including first and second trays, the first and second trays each having a top cover with a first pattern of openings and a converging portion, wherein an inlet of the converging portion includes a bottom surface with a second pattern of openings;
   a return extending along a longitudinal direction of the plurality of trays, the return having at least one opening fluidly coupled with at least one of the converging portions; and
   a fluid flow director to divide the flow into a plurality of partial fluid flow streams, the plurality of partial flow streams comprising a first partial fluid flow stream and a second partial fluid flow stream, wherein the first partial fluid flow stream is to be directed towards the first tray and the second partial fluid flow stream is to be directed to flow around and past the first tray, and toward the second tray.

2. The apparatus as defined in claim 1, wherein a number of trays of the plurality of trays equals a number of partial fluid flow streams of the plurality of partial fluid flow streams.

3. The apparatus as defined in claim 1, wherein each of the partial flows streams is to be directed to a dedicated tray of the plurality of trays, while bypassing at least some of the other trays of the plurality of trays.

4. The apparatus as defined in claim 3, wherein each of the partial fluid flow streams is to be directed to bypass any but its dedicated tray of the plurality of trays.

5. The apparatus as defined in claim 1, wherein the partial fluid flow streams are directed towards the return after passing at least one tray of the plurality of trays after passing the bulk material in the at least one tray or after being treated by the bulk material in the at least one tray.

6. The apparatus as defined in claim 1, wherein the return directs the partial fluid flow streams to the outlet of the process chamber after their treatment by the bulk material in the plurality of trays.

7. The apparatus as defined in claim 1, wherein the first and second fluid flow streams have substantially similar flow rates.

8. The apparatus as defined in claim 1, wherein the return is in fluid communication with the outlet.

9. The apparatus as defined in claim 1, wherein the bulk material comprises irregularly or regularly shaped solid bodies.

10. The apparatus as defined in claim 9, wherein the irregularly or regularly shaped solid bodies comprise ball-type, ring-type, or disk-type bodies, or saddles.

11. The apparatus as defined in claim 10, wherein the bulk material comprises a catalyst.

12. The apparatus as defined in claim 1, wherein the fluid flow director comprises an annular gap around at least one of the first or second trays.

13. The apparatus as defined in claim 1, wherein at least one of the first or second pattern of openings have perforations that are smaller than the bulk material.

14. The apparatus as defined in claim 1, wherein the trays are positioned along the longitudinal direction of the process chamber relative to one another.

15. The apparatus as defined in claim 1, wherein the process chamber comprises a catalytic reactor.

16. The apparatus as defined in claim 1, wherein the first and second partial fluid streams are directed to non-sequential trays.

17. The apparatus as defined in claim 1, wherein the first and second trays are coupled to the return.

18. The apparatus as defined in claim 17, wherein annular gaps surrounding the first and second trays are substantially unobstructed.

19. A method comprising:
dividing a flow of fluid through a process chamber into partial streams, each stream having a pre-defined flow rate; and
directing each of the partial streams to trays disposed within the process chamber and arranged in a longitudinal direction of the process chamber to one another, at least a portion of the partial streams to flow around some of the trays, each tray having bulk material to treat the fluid, the trays each having a top cover with a first pattern of openings and a converging portion, wherein an inlet of the converging portion includes a bottom surface with a second pattern of openings, wherein at least one of the converging portions is fluidly coupled with a return extending along the longitudinal direction via an opening, and wherein at least two of the partial streams are to be directed to different trays of the trays and have predefined, adjusted, adjustable flow rates or flow rate ratios.

20. The method as defined in claim 19, wherein at least two of the partial streams have substantially similar flow rates.

21. The method as defined in claim 19, wherein the process chamber comprises a catalyst reactor.

22. The method as defined in claim 19, further comprising combining the partial streams exiting the trays into an exit flow.

23. The method as defined in claim 19, wherein at least a portion of the trays have openings in fluid communication with a central return of the process chamber for the partial streams to exit the process chamber.

24. The method as defined in claim 19, wherein the bulk material comprises irregularly or regularly shaped solid bodies.

25. The method as defined in claim 24, wherein the irregularly or regularly shaped solid bodies comprise ball-type, ring-type, disk-type bodies, or saddles.

26. The method as defined in claim 19 wherein at least a portion of the trays have surfaces that comprise perforations that are smaller than the bulk material.

27. The method as defined in claim 19, wherein dividing the flow of the fluid comprises allowing portions of the flow to flow through annular gaps surrounding outer surfaces of the trays.

28. An apparatus comprising:
a plurality of trays of a crossflow reactor, the trays containing bulk material, wherein the crossflow reactor has an inlet and an outlet to allow fluid to flow therethrough;
a return extending along a longitudinal direction defined by centers of trays of the plurality of trays; and
a housing of the crossflow reactor defining an annular gap between the trays and the housing; wherein in at least a portion of the trays, a portion of the fluid flows through each tray and is treated by the bulk material, and another portion of the fluid flows around the trays and through the annular gap, at least one of the plurality of trays having a top cover with a first pattern of openings and a converging portion, wherein an inlet of the converging portion includes a bottom surface with a second pattern of openings, and the converging portion has an opening fluidly coupled with the return.

29. The apparatus as defined in claim 28, wherein at least a portion of the plurality of trays have openings in fluid communication with the return, the return to guide the fluid from the trays to the outlet.

30. The apparatus as defined in claim 28, wherein the return has a varying diameter along a longitudinal length of the crossflow reactor.

31. The apparatus as defined in claim 28, wherein the annular gap between the trays and housing varies along a longitudinal length of the crossflow reactor.

32. An apparatus comprising:
a plurality of trays of a reactor, the trays containing bulk material, wherein the reactor has an inlet and an outlet to allow fluid to flow therethrough, and wherein each of the trays are separated by a gap along a longitudinal direction of the reactor and wherein the trays have a substantially cylindrical shape, at least one tray of the plurality of trays having a top cover with a first pattern of openings and a converging portion, wherein an inlet of the converging portion includes a bottom surface with a second pattern of openings;
a housing of the reactor defining an annular gap between the trays and the housing, the housing having a substantially cylindrical shape; and
a return in fluid communication with at least a portion of the trays and the outlet, wherein in at least a portion of the trays, a portion of the fluid flows into the trays, is treated by the bulk material and directed to the return, and another portion of the fluid flows around the trays, wherein the converging portion has an opening fluidly coupled with the return.

33. The apparatus as defined in claim 32, wherein the return is located centrally in relation to the reactor.

* * * * *